United States Patent
Omae et al.

(10) Patent No.: US 7,496,083 B2
(45) Date of Patent: Feb. 24, 2009

(54) MOBILITY MANAGEMENT NODE, PAGING AREA FORMING METHOD, AND MOBILITY MANAGEMENT PROGRAM

(75) Inventors: Koji Omae, Yokohama (JP); Masahiro Inoue, Yokosuka (JP); Ichiro Okajima, Yokohama (JP); Narumi Umeda, Yokohama (JP)

(73) Assignee: NT DoCoMo, Inc., Tokyo (JP)

( * ) Notice: Subject to any disclaimer, the term of this patent is extended or adjusted under 35 U.S.C. 154(b) by 951 days.

(21) Appl. No.: 10/743,831

(22) Filed: Dec. 24, 2003

(65) Prior Publication Data

US 2004/0136351 A1 Jul. 15, 2004

(30) Foreign Application Priority Data

Dec. 27, 2002 (JP) ............................. 2002-381386

(51) Int. Cl.
*H04J 3/24* (2006.01)
(52) U.S. Cl. ........................................ 370/349; 370/475
(58) Field of Classification Search ................ 370/279, 370/277–278, 389–394, 431–433, 471–475, 370/328, 349
See application file for complete search history.

(56) References Cited

U.S. PATENT DOCUMENTS

| 6,594,493 B1 * | 7/2003 | Davies et al. ................ 455/436 |
| 7,123,599 B2 * | 10/2006 | Yano et al. ................... 370/331 |
| 2002/0046287 A1 | 4/2002 | La Porta et al. |
| 2002/0172207 A1 * | 11/2002 | Saito et al. .................. 370/400 |
| 2003/0088671 A1 * | 5/2003 | Klinker et al. ................ 709/225 |

FOREIGN PATENT DOCUMENTS

| JP | 2001-251660 | 9/2001 |
| WO | WO 01/97549 | 12/2001 |

OTHER PUBLICATIONS

H. Soliman, et al.; IETF Mobile IP Working Group Internet-Draft, XP-002253178, pp. 1-34, "Hierarchical MIPV6 Mobility Management (HMIPV6)", Jul. 5, 2002.
J-Z . Sun, et al., Proc. SPIE Wireless and Mobile Communications, vol. 4586, XP-002277257, pp. 155-166, "Mobility Management Techniques for the Next Generation Wireless Networks", Oct. 2001.

* cited by examiner

*Primary Examiner*—Kwang B. Yao
*Assistant Examiner*—Juvena Loo
(74) *Attorney, Agent, or Firm*—Oblon, Spivak, McClelland, Maier & Neustadt, P.C.

(57) ABSTRACT

Provided is a mobility management node capable of forming a paging area, without need for management of a migration history at a mobile node and for notification of a migration history from a mobile node to a network. In mobility management node (MAP) 1, mobility manager 66 lets binding cache 68 store a home address and a c/o address of each mobile node (MN) in correlation with each other. Migration history storage 70 stores a transition frequency of the c/o address stored in binding cache 68 in correlation with prefixes before and after transition. Migration history storage 70 defines paging area information by a set of prefixes included in combinations containing common prefixes, out of combinations of prefixes before and after transition with each of which a transition frequency over a predetermined reference value is correlated. Paging controller 72 notifies the MN of this paging area information.

8 Claims, 11 Drawing Sheets

|       | Pre10 | Pre11 | Pre12 | Pre13 | Pre14 | Pre15 | Pre16 | Pre17 | Pre18 | Pre19 |
|-------|-------|-------|-------|-------|-------|-------|-------|-------|-------|-------|
| Pre10 |       |       |       |       |       |       |       |       |       |       |
| Pre11 | 25    |       |       |       |       |       |       |       |       |       |
| Pre12 | 0     | 563   |       |       |       |       |       |       |       |       |
| Pre13 | 0     | 0     | 6     |       |       |       |       |       |       |       |
| Pre14 | 0     | 0     | 0     | 535   |       |       |       |       |       |       |
| Pre15 | 0     | 0     | 0     | 0     | 11    |       |       |       |       |       |
| Pre16 | 0     | 0     | 0     | 0     | 0     | 1211  |       |       |       |       |
| Pre17 | 1156  | 0     | 0     | 0     | 0     | 0     | 6     |       |       |       |
| Pre18 | 0     | 0     | 0     | 0     | 9     | 0     | 1199  | 1162  |       |       |
| Pre19 | 0     | 0     | 551   | 548   | 0     | 0     | 0     | 0     | 26    |       |

Fig.4

| | Pre10 | Pre11 | Pre12 | Pre13 | Pre14 | Pre15 | Pre16 | Pre17 | Pre18 | Pre19 |
|---|---|---|---|---|---|---|---|---|---|---|
| Pre10 | | | | | | | | | | |
| Pre11 | 25 | | | | | | | | | |
| Pre12 | 0 | 563 | | | | | | | | |
| Pre13 | 0 | 0 | 6 | | | | | | | |
| Pre14 | 0 | 0 | 0 | 535 | | | | | | |
| Pre15 | 0 | 0 | 0 | 0 | 11 | | | | | |
| Pre16 | 0 | 0 | 0 | 0 | 0 | 1211 | | | | |
| Pre17 | 1156 | 0 | 0 | 0 | 0 | 0 | 6 | | | |
| Pre18 | 0 | 0 | 0 | 0 | 9 | 0 | 1199 | 1162 | | |
| Pre19 | 0 | 0 | 551 | 548 | 0 | 0 | 0 | 0 | 26 | |

| MN ADDRESS | C/O ADDRESS | PAGING AREA | HOST IDENTIFIER |
|---|---|---|---|
| HoA24 | -- | Pre11, Pre12, Pre19, Pre13, Pre14 | No24 |
| HoA25 | CoA1425 | -- | -- |
| HoA26 | CoA1426 | -- | -- |

Fig.8

| MN ADDRESS | C/O ADDRESS | PAGING AREA | HOST IDENTIFIER |
|---|---|---|---|
| HoA24 | CoA1424 | -- | No24 |
| HoA25 | CoA1425 | -- | -- |
| HoA26 | CoA1426 | -- | -- |

| MN ADDRESS | C/O ADDRESS | REGISTRATION TIME(s) | CoA UPDATE FREQUENCY | PAGING AREA | HOST IDENTIFIER |
|---|---|---|---|---|---|
| HoA24 | CoA1424 | 559 | 2 | -- | -- |
| HoA25 | CoA1425 | 1025 | 15 | -- | -- |
| HoA26 | CoA1426 | 12 | 1 | -- | -- |

MOBILITY MANAGEMENT NODE, PAGING AREA FORMING METHOD, AND MOBILITY MANAGEMENT PROGRAM

BACKGROUND OF THE INVENTION

1. Field of the Invention

The present invention relates to a mobility management node in an IP packet communication system, a paging area forming method carried out by the mobility management node, and a mobility management program executed by a computer in the mobility management node.

2. Related Background Art

In Mobile IP and its extended systems, in order for a mobile node to receive packets addressed thereto, even with changeover of its connected network from a home network to another network, the mobile node transmits a binding update packet (BU: Binding Update packet, which will be referred to as "BU") to a home agent (HA: Home Agent) at every change of its connected network. For decreasing the number of BUs, a paging area is used. The "paging area" is an area in which, where the mobile node is not under communication, the mobile node transmits no BU even with migration between networks within a certain region. As long as the mobile node is within the paging area, it transmits no BU to HA. However, the mobile node need transmit a BU even in a non-communication state if it goes out of the paging area. Therefore, in order to decrease the number of BUs, it is necessary to properly set the paging areas.

A conventional method of forming the paging areas was that in which a mobile node successively stored records of base stations passed, or stored changes of geographical locations by means of GPS, managed migration patterns of its own, and notified a node in a network of data associated with the migration patterns. In another method, each mobile node was configured so that at every handoff between base stations the mobile node notified a newly connected base station of information about a previously connected base station before a handoff (e.g., cf. Japanese Patent Application Laid-Open No. 2001-251660). A node in the network created a paging area on the basis of the information thus notified of by the mobile nodes and notified the mobile nodes of information about networks included in the paging area.

SUMMARY OF THE INVENTION

However, the above-stated methods required the mobile nodes to store the migration histories of the base stations, location patterns, etc., which brought the disadvantage that the memory was used therefor in the mobile nodes. The mobile nodes need have notified the network of the migration histories, which posed the problem that the network capacity was consumed.

The present invention has been accomplished to solve the above problem, and an object of the present invention is to provide a mobility management node, a paging area forming method, and a mobility management program capable of forming a paging area, without need for management of migration histories at mobile nodes and for notification of migration histories from mobile nodes to networks.

In order to accomplish the above object, a mobility management node according to the present invention is a mobility management node comprising: mobility management means for correlating a home address in a home network of a mobile node with a c/o (care-of) address in a network where the mobile node is located after movement; binding storing means for storing the home address and the c/o address of the mobile node correlated with each other by the mobility management means; transition detecting means for monitoring transition of the c/o address stored in the binding storing means, and for detecting a prefix of the c/o address before the transition and a prefix of the c/o address after the transition; transition history storing means for storing a transition frequency of the c/o address in correlation with the prefix of the c/o address before the transition and the prefix of the c/o address after the transition detected by the transition detecting means; paging area forming means for extracting predetermined combinations of the prefix of the c/o address before the transition with the prefix of the c/o address after the transition, stored by the transition history storing means, and for generating paging area information by a set of the prefixes included in the extracted combinations; and paging area notifying means for notifying the mobile node of the paging area information generated by the paging area forming means.

In order to achieve the above object, a paging area forming method according to the present invention is a paging area forming method comprising: a mobility management step wherein mobility management means correlates a home address in a home network of a mobile node with a c/o address in a network where the mobile node is located after movement, and stores the addresses in correlation with each other into binding storing means; a transition detecting step wherein transition detecting means monitors transition of the c/o address stored in the binding storing means, detects a prefix of the c/o address before the transition and a prefix of the c/o address after the transition, and lets transition history storing means store a transition frequency of the c/o address in correlation with the prefix of the c/o address before the transition and the prefix of the c/o address after the transition; a paging area forming step wherein paging area forming means extracts predetermined combinations of the prefix of the c/o address before the transition with the prefix of the c/o address after the transition, stored in the transition history storing means, and generates paging area information by a set of the prefixes included in the extracted combinations; and a paging area notifying step wherein paging area notifying means notifies the mobile node of the paging area information generated by the paging area forming means.

In order to achieve the above object, a mobility management program according to the present invention is a mobility management program for letting a computer function as: mobility management means for correlating a home address in a home network of a mobile node, with a c/o address in a network where the mobile node is located after movement; binding storing means for storing the home address and the c/o address of the mobile node correlated with each other by the mobility management means; transition detecting means for monitoring transition of the c/o address stored in the binding storing means, and for detecting a prefix of the c/o address before the transition and a prefix of the c/o address after the transition; transition history storing means for storing a transition frequency of the c/o address in correlation with the prefix of the c/o address before the transition and the prefix of the c/o address after the transition detected by the transition detecting means; paging area forming means for extracting predetermined combinations of the prefix of the c/o address before the transition with the prefix of the c/o address after the transition, stored by the transition history storing means, and for generating paging area information by a set of the prefixes included in the extracted combinations; and paging area notifying means for notifying the mobile node of the paging area information generated by the paging area forming means.

According to these aspects of the invention, the mobility management node stores the transition frequency in correlation with the prefixes before and after the transition of the c/o address of the mobile node. The mobility management node extracts the predetermined combinations of the prefixes of the c/o addresses before and after the transition, generates the paging area information by a set of prefixes included in the extracted combinations, and notifies the mobile node of the paging area information. Since the mobility management node forms a paging area by generating the paging area information on the basis of the transition history of the c/o address of the mobile node as described above, it can form an appropriate paging area based on the transition history of the c/o address of the mobile node. Since the mobility management node forms the paging area on the basis of the transition history of the c/o address of the mobile node, the mobility management node is able to form the paging area, without need for independent management of the migration history at the mobile node and for notification of the migration history from the mobile node to the network.

In the mobility management node of the present invention, preferably, the paging area forming means extracts combinations of the prefix before the transition with the prefix after the transition with each of which a transition frequency over a predetermined reference value is correlated among the transition frequencies stored by the transition history storing means, extracts combinations having the common prefixes, out of the extracted combinations, and generates the paging area information by a set of the prefixes included in the combinations finally extracted.

In the paging area forming method of the present invention, preferably, in the paging area forming step the paging area forming means extracts combinations of the prefix before the transition with the prefix after the transition with each of which a transition frequency over a predetermined reference value is correlated among the transition frequencies stored by the transition history storing means, extracts combinations having the common prefixes, out of the extracted combinations, and generates the paging area information by a set of the prefixes included in the combinations finally extracted.

In the mobility management program of the present invention, preferably, the paging area forming means extracts combinations of the prefix before the transition with the prefix after the transition with each of which a transition frequency over a predetermined reference value is correlated among the transition frequencies stored by the transition history storing means, extracts combinations having the common prefixes, out of the extracted combinations, and generates the paging area information by a set of the prefixes included in the combinations finally extracted.

According to these aspects of the invention, the mobility management node extracts combinations of prefixes before and after the transition with each of which the transition frequency over the predetermined reference value is correlated among the transition frequencies stored in correlation with the prefixes before and after the transition of the c/o address of the mobile node, and extracts combinations having common prefixes, out of the extracted combinations. The mobility management node defines a set of prefixes included in the extracted combinations, as paging area information. Since the paging area information generated in this way is a set of prefixes of respective networks before and after changeover as frequently occurring changeover of connection with movement of the mobile node, it is more appropriate paging area information based on the history of movement of the mobile node.

The mobility management node of the present invention may be configured in a configuration further comprising: registration time interval measuring means for measuring a registration time interval during which an address of the mobile node is continuously registered in the binding storing means; and update frequency measuring means for measuring an update frequency of the c/o address of the mobile node stored in the binding storing means; wherein the paging area forming means uses a plurality of predetermined reference values different from each other to generate the paging area information as to each of the plurality of predetermined reference values, thereby generating a plurality of paging area information items, and wherein the paging area notifying means derives an update frequency per unit time of the c/o address of the mobile node, based on the registration time interval of the mobile node measured by the registration time interval measuring means and the update frequency of the mobile node measured by the update frequency measuring means, and notifies the mobile node of a paging area information item selected out of the plurality of paging area information items in accordance with the update frequency per unit time of the c/o address of the mobile node, based on a predetermined rule defined so that a number of prefixes included in the paging area information increases against increase of the update frequency per unit time of the c/o address.

The paging area forming method of the present invention may be configured in a configuration further comprising a registration time interval measuring step wherein registration time interval measuring means measures a registration time interval during which an address of the mobile node is continuously registered in the binding storing means; and an update frequency measuring step wherein update frequency measuring means measures an update frequency of the c/o address of the mobile node stored in the binding storing means; wherein in the paging area forming step the paging area forming means uses a plurality of predetermined reference values different from each other to generate the paging area information as to each of the plurality of predetermined reference values, thereby generating a plurality of paging areas, and wherein in the paging area notifying step the paging area notifying means derives an update frequency per unit time of the c/o address of the mobile node, based on the registration time interval of the mobile node measured by the registration time interval measuring means and the update frequency of the mobile node measured by the update frequency measuring means, and notifies the mobile node of a paging area information item selected out of the plurality of paging area information items in accordance with the update frequency per unit time of the c/o address of the mobile node, based on a predetermined rule defined so that a number of prefixes included in the paging area information increases against increase of the update frequency per unit time of the c/o address.

The mobility management program of the present invention may be configured in a configuration for letting the computer further function as: registration time interval measuring means for measuring a registration time interval during which an address of the mobile node is continuously registered in the binding storing means; and update frequency measuring means for measuring an update frequency of the c/o address of the mobile node stored in the binding storing means; wherein the paging area forming means uses a plurality of predetermined reference values different from each other to generate the paging area information as to each of the plurality of predetermined reference values, thereby generating a plurality of paging area information items, and wherein the paging area notifying means derives an update frequency per unit time of the c/o address of the mobile node, based on the registration time interval of the mobile node measured by the registration time interval measuring means and the update frequency of the mobile node measured by the update frequency measuring means, and notifies the mobile node of a paging area information item selected out of the plurality of paging area information items in accordance with the update frequency per unit time of the c/o address of the mobile node, based on a predetermined rule defined so that a number of prefixes included in the paging area information increases against increase of the update frequency per unit time of the c/o address.

According to these aspects of the invention, the mobility management node uses a plurality of predetermined reference values different from each other to generate the paging area information in much the same manner as above as to each of these predetermined reference values, thereby forming a plurality of paging areas. Namely, the paging area information generated with the use of a small predetermined reference value contains many prefixes, and thus the size is large of the paging area formed by this paging area information. On the other hand, the paging area information generated with the use of a large predetermined reference value contains a small number of prefixes, and thus the size is small of the paging area formed by this paging area information. The mobility management node measures, for each mobile node, the registration time interval during which the address is continuously registered in the binding storing means, and the update frequency of the c/o address in the binding storing means, and derives the update frequency per unit time of the c/o address for each mobile node. It is speculated that the update frequency per unit time is proportional to the moving speed of the mobile node. The mobility management means notifies the mobile node of the paging area information selected out of the plurality of paging area information items according to the update frequency per unit time of the c/o address of the mobile node derived as described above, based on the predetermined rule defined so that the number of prefixes included in the paging area information increases against increase of the update frequency per unit time of the c/o address. Therefore, the mobility management means is able to notify the mobile node moving at high moving speed of the paging area information of the paging area of large size and notify the mobile node moving at low moving speed of the paging area information of the paging area of small size. Namely, the mobility management means is able to notify the mobile node of the paging area information of the paging area of appropriate size according to the moving speed of the mobile node.

The present invention will be more fully understood from the detailed description given hereinbelow and the attached drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

In the course of the following detailed description, reference will be made to the attached drawings in which.

DESCRIPTION OF THE PREFERRED EMBODIMENTS

Mobility management node (hereinafter denoted by "MAP," which is an abbreviation of Mobility Anchor Point) 1 according to an embodiment of the present invention will be described below with reference to the accompanying drawings. In the description hereinafter, identical or equivalent portions will be denoted by the same reference symbols throughout the drawings, for easier understanding of the description.

Figure 1:
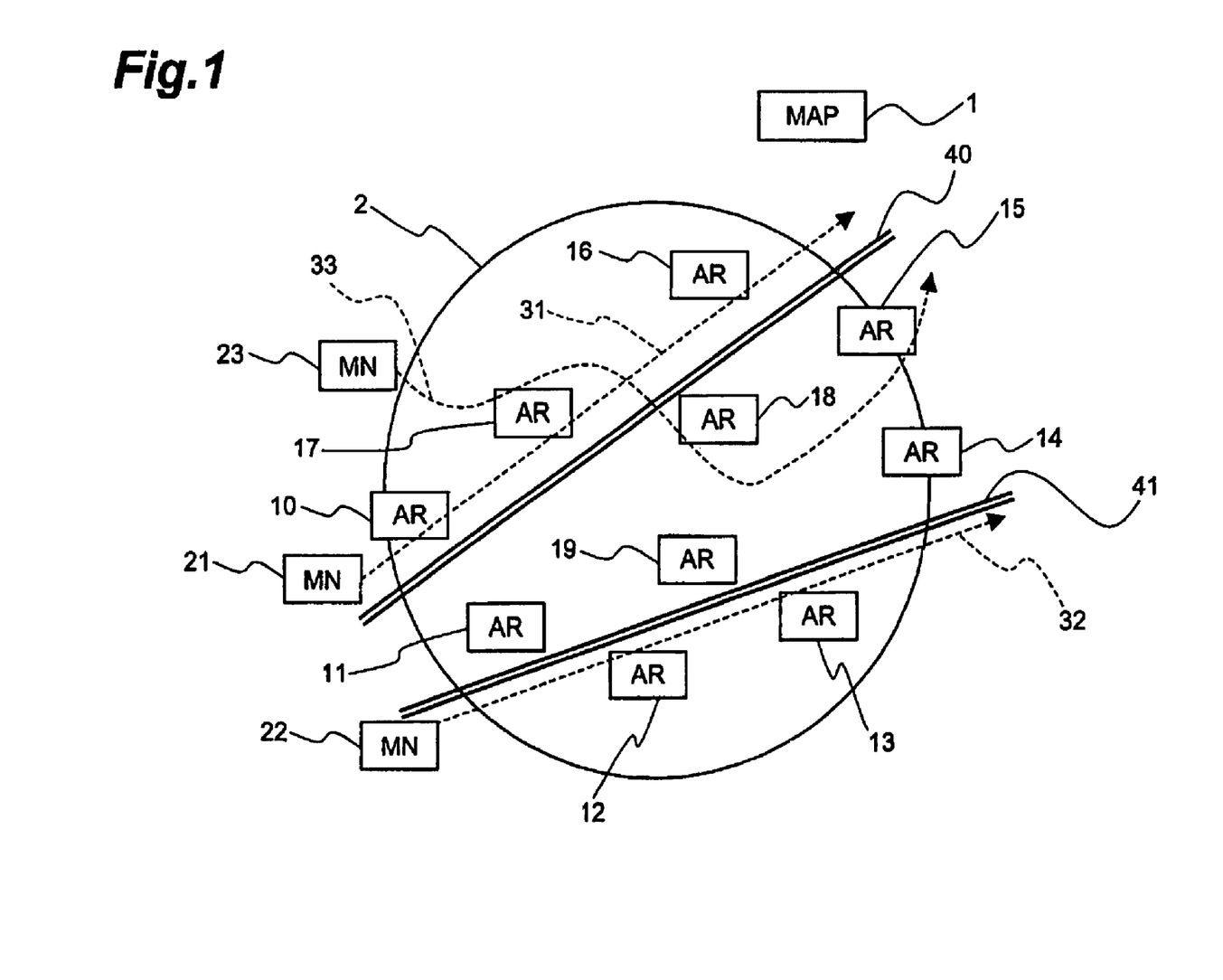
FIG. 1 is an illustration showing a network environment managed by a mobility management node according to an embodiment.

FIG. 1 is an illustration showing a network environment managed by MAP 1. MAP 1 is a mobility management node adapted to HMIP (Hierarchical Mobile IP). MAP 1 accommodates a plurality of access routers (hereinafter denoted each by "AR," which is an abbreviation of Access Router) in its service area 2. In the present embodiment, MAP 1 accommodates ARs 10-19 in its service area 2.

ARs 10-19 are routers adapted to HMIP. ARs 10-19 form their respective networks different from each other and relay packets from each mobile node (hereinafter denoted by "MN," which is an abbreviation of Mobile Node) accommodated in an area of a network thereof. The "network" herein is a term also including such a concept as a single cell established by each of ARs 10-19. In the environment shown in FIG. 1, ARs 10, 15, 16, 17, and 18 are located near highway 40. ARs 11, 12, 13, 14, and 19 are located near highway 41. In the environment shown in FIG. 1, MNs 21-23 pass the service area 2 of MAP 1.

MNs 21-23 are mobile nodes adapted to HMIP. Each of MNs 21-23 performs packet communication while being connected to one of ARs 10-19 accommodating MNs existing in its area at a location after movement. Each of MNs 21-23 can move into two states of a communication mode and an idle mode. MNs 21-23 operate based on HMIP in the communication mode.

MNs 21-23 monitor router advertisements (hereinafter denoted each by "RA," which is an abbreviation of Router Advertisement) from ARs in the idle mode. MNs 21-23, in the idle mode, transmit no BU to MAP 1 unless moving out of a paging area. The "RA" herein is a packet for a router to advertise prefix information. In HMIP, an address assigned to an MN consists of 128 bits, the upper 64 bits of which constitute a prefix. A prefix is an identifier indicating a network to which a host is connected. The lower 64 bits of the above 128 bits constitute a host identifier, which is an identifier for uniquely identifying a host in a network.

When an MN 21-23, in the idle mode, receives a paging packet sent into the paging area by MAP 1, it transmits to MAP 1 a BU containing a c/o address in a network established by an AR accommodating itself at the location of the reception of the packet, and then makes transition into the communication mode. MN 21-23 makes transition into the idle mode after a lapse of a predetermined time duration from a point at which the MN transmits or receives the last data packet in the communication mode. This predetermined time duration is set, for example, to 15 seconds.

Figure 2:
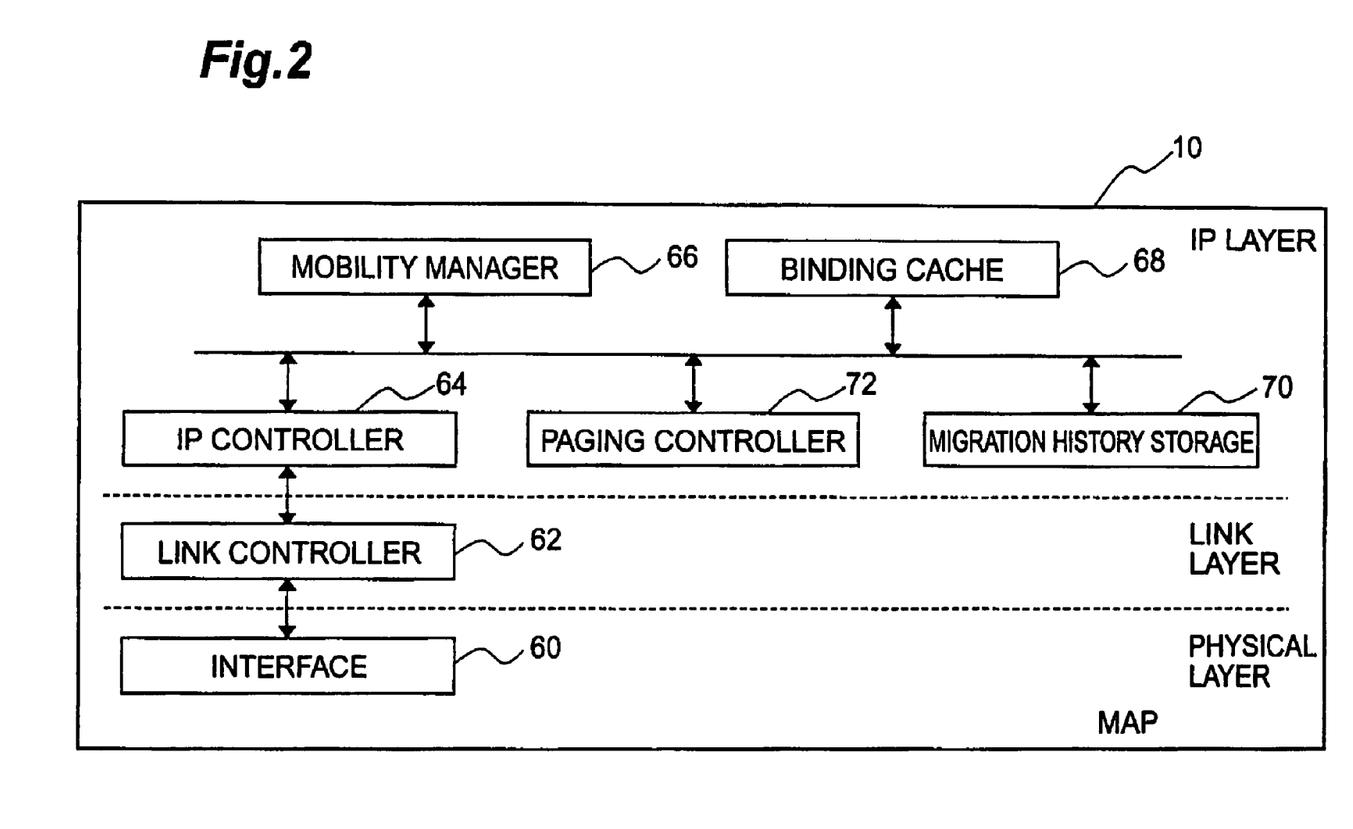
FIG. 2 is an illustration showing a functional configuration of a mobility management node according to an embodiment.

MAP 1 will be detailed below. FIG. 2 is a block diagram showing the functional configuration of MAP 1. MAP 1 is comprised of interface 60, link controller 62, IP controller 64, mobility manager (mobility management means) 66, binding cache (binding storing means) 68, migration history storage (transition history storing means, transition detecting means, paging area forming means) 70, and paging controller (paging area notifying means) 72.

The interface 60 is a part included in the physical layer, which transmits a packet from link controller 62 onto the link and which hands over a packet received from the link, to link controller 62.

The link controller 62 is a part included in the link layer, which hands over a packet from IP controller 64 to interface 60 and which hands over a packet from interface 60 to IP controller 64.

The IP controller 64 is a part included in the IP layer, which handles packets about mobility such as BUs to and from mobility manager 66 and which handles packets about paging such as a paging initialization packet, a paging packet, and so on to and from paging controller 72. When receiving a packet addressed to an MN, the IP controller 64 refers to binding cache 68 to determine whether the MN is in the idle mode. When the MN is in the idle mode, the IP controller 64 stores the received packet into a packet buffer space (not shown) and notifies paging controller 72 of the presence of the packet addressed to the MN in the idle mode. The description will be given later about the technique for IP controller 64 to refer to the binding cache 68 to determine whether the MN is in the idle mode.

The mobility manager 66 operates based on HMIP. More specifically, the mobility manager 66 handles BUs transmitted from MNs. Namely, when receiving a BU from an MN, the mobility manager 66 registers the home address of the MN and the c/o address of the MN in the network where the MN is located, in correlation with each other in binding cache 68.

The migration history storage 70 monitors transition of c/o addresses for each of MNs registered in the binding cache 68. The migration history storage 70 has a migration history table and, when detecting a transition between c/o addresses of one MN, it stores a transition frequency thereof in correlation with the prefix of the c/o address before the transition and with the prefix of the c/o address after the transition, into the migration history table.

Figure 3:
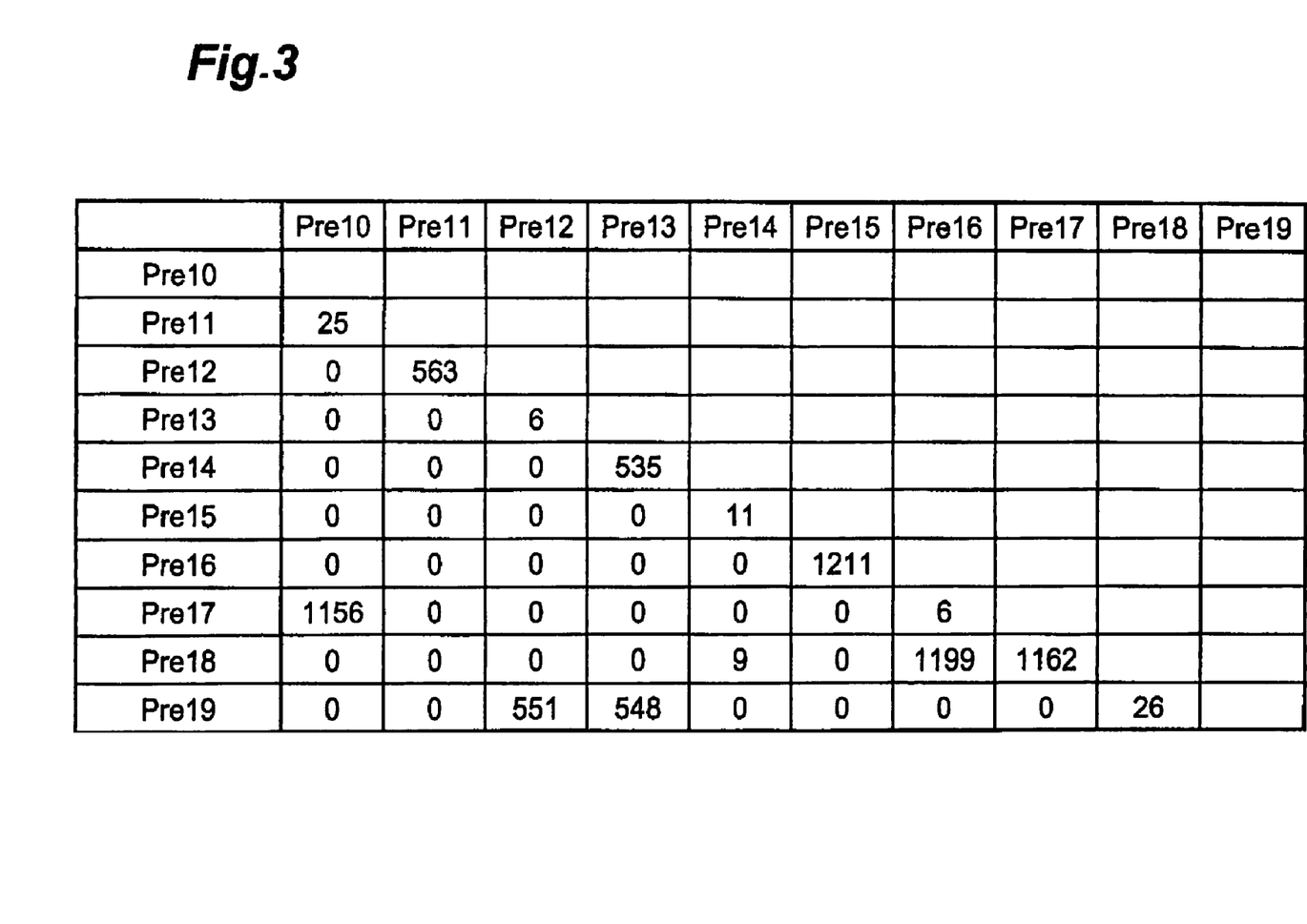
FIG. 3 is an illustration showing an example of data stored in a migration history table by a migration history storage according to an embodiment.

FIG. 3 is an illustration showing data stored in the migration history table by the migration history storage 70, which shows an example of data stored in the migration history table in a case where MNs 21-23 migrate through their respective paths 31-33 as shown in FIG. 1. In FIG. 3, Pre10-Pre19 are prefixes given to the networks established by respective ARs 10-19 to which MNs are to be connected.

As shown in FIG. 3, the migration history storage 70 stores the transition frequencies in correlation with prefixes before and after transition in the migration history table. When MN 21 travels along path 31 on highway 40 as shown in FIG. 1 to make the transition of connected AR in the following order: AR 10, AR 17, AR 18, AR 16, and AR 15 as named, an increment of 1 is given to each of the above transition frequencies correlated with the prefixes of the respective networks of AR 10 and AR 17, of AR 17 and AR 18, of AR 18 and AR 16, and of AR 16 and AR 15 before and after the transition. Concerning MN 23, since it moves similarly along path 33 near highway 40, an increment is also given to each of the transition frequencies in much the same manner as above.

On the other hand, when MN 22 passes along path 32 on highway 41 to make the transition of connected AR in the following order: AR 11, AR 12, AR 19, AR 13, and AR 14 as named, as shown in FIG. 1, an increment of 1 is given to each of the above transition frequencies correlated with the prefixes of the respective networks of AR 11 and AR 12, of AR 12 and AR 19, of AR 19 and AR 13, and of AR 13 and AR 14 before and after the transition.

As MNs make transition between ARs placed along highways 40 and 41 in this way, the transition frequencies correlated with these prefixes increase. The migration history storage 70 stores the data about the transition frequencies for a predetermined time interval. This "predetermined time interval" can be set, for example, to six hours. Where MAP is located in areas where MNs momentarily move, e.g., in downtown areas, the predetermined time interval can be set shorter than six hours; conversely, where MAP is located in areas where less migration of MN occurs, e.g., in the countryside, the predetermined time interval can be set longer than six hours, in order to increase the number of samples.

The migration history storage 70 refers to the migration history table to create a paging area. More specifically, the migration history storage 70 is configured so that, where transition frequencies stored in the migration history table exceed a predetermined reference value, it extracts combinations of prefixes before and after the transition correlated with the transition frequencies. The migration history storage 70 further extracts combinations with common prefixes, out of the above extracted combinations and defines a set of prefixes included in the extracted combinations, as paging area information, thereby forming a paging area.

Figure 4:
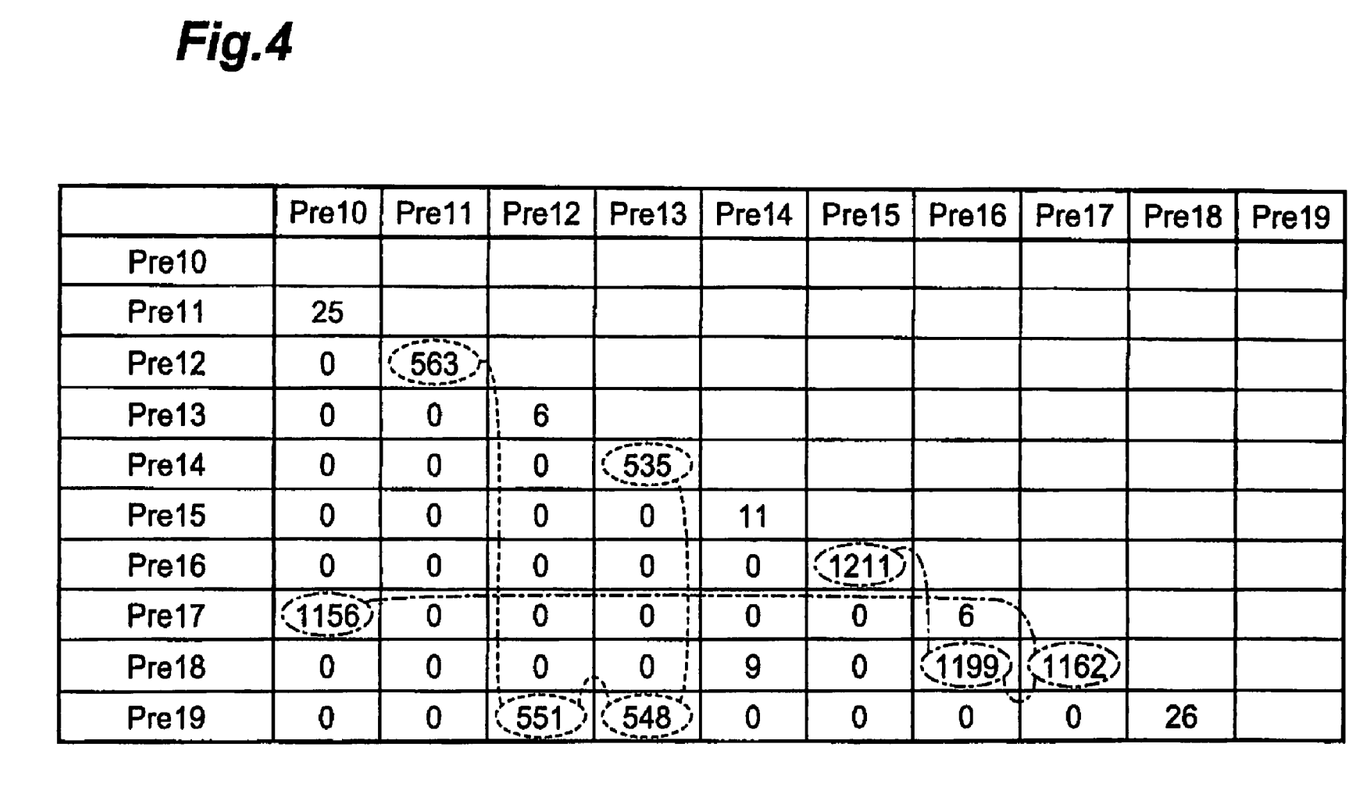
FIG. 4 is an illustration for explaining a process of forming paging areas by use of the migration history table shown in FIG. 3.
Figure 5:
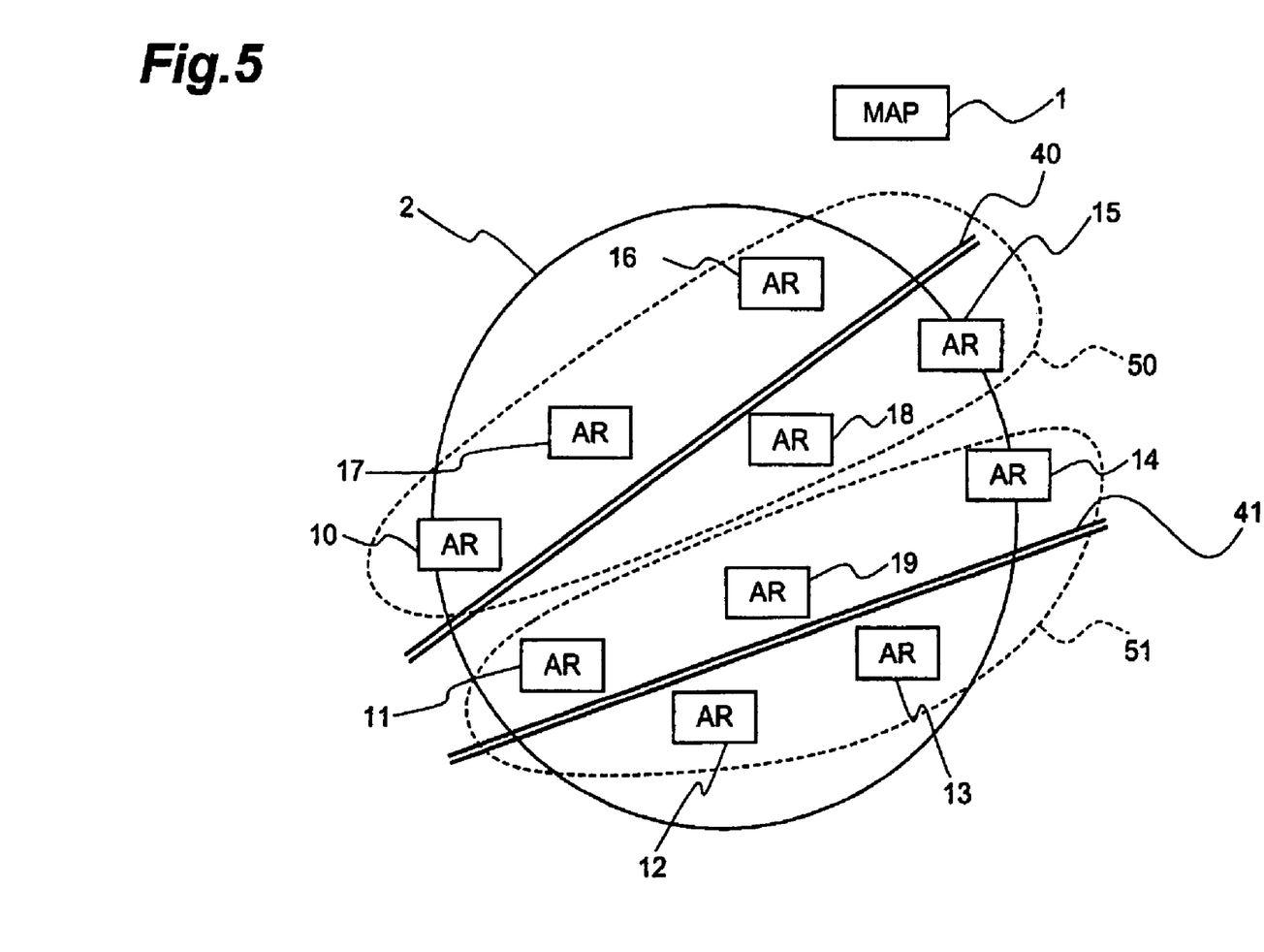
FIG. 5 is an illustration showing the paging areas formed through the use of the migration history table shown in FIG. 3, by the migration history storage.

FIG. 4 is an illustration for explaining the process for migration history storage 70 to form paging areas through the use of the migration history table shown in FIG. 3. FIG. 5 is an illustration showing the paging areas formed by the migration history storage 70 through the use of the migration history table shown in FIG. 3. As shown in FIG. 4, migration history storage 70 defines sets of prefixes included in combinations with common prefixes, among combinations of prefixes before and after transition correlated with the transition frequencies over the predetermined reference value, as paging area information to form paging areas. Since the combinations of prefixes of c/o addresses before and after transition correlated with the transition frequencies bounded by chain lines in FIG. 4 are combinations with common prefixes, the set of the prefixes Pre10, Pre17, Pre18, Pre16, and Pre15 included in these combinations are defined as paging area information to form one paging area. Since the combinations of prefixes of c/o addresses before and after transition correlated with the transition frequencies bounded by dashed lines in FIG. 4 are combinations with common prefixes, the set of the prefixes Pre11, Pre12, Pre19, Pre13, and Pre14 included in these combinations are defined as paging area information to form one paging area.

The paging areas formed in this way must represent groups of ARs between which MNs often make transition, like paging area 50 including AR 10, AR 17, AR 18, AR 16, and AR 15 located along highway 41 and like paging area 51 including AR 11, AR 12, AR 19, AR 13, and AR 14 located along highway 40, as shown in FIG. 5.

The migration history storage 70 monitors the transition of the c/o addresses registered in the binding cache as described above, and updates the migration history table at every time of transition of the c/o addresses. The migration history storage 70 forms the paging areas at every time of update and regularly notifies paging controller 72 of the paging area information.

The paging controller 72 handles the packets about paging. More specifically, when the paging controller 72 receives a paging initialization packet, which an MN sends to MAP 1 in order to initialize the paging area information stored at the MN, it notifies the MN of a candidate for paging area information. Paging controller 72 is able to specify an AR establishing a network which accommodates the location of the MN, from the prefix of the c/o address of the MN included in the paging initialization packet sent by the MN. Paging controller 72 notifies the MN of the paging area information containing the prefix in the specified network, as a candidate.

The MN selects paging area information out of the candidate for the paging area information notified of, transmits a paging area registration request to give notice of the selected paging area information, to MAP 1, and then moves into the idle mode. Paging controller 72 receives the paging area registration request sent from the MN, stores the paging area information included in the paging area registration request, for each MN into binding cache 68, deletes the c/o address of the MN stored in the binding cache 68, and further stores the host identifier of the address of the MN.

Figure 6:
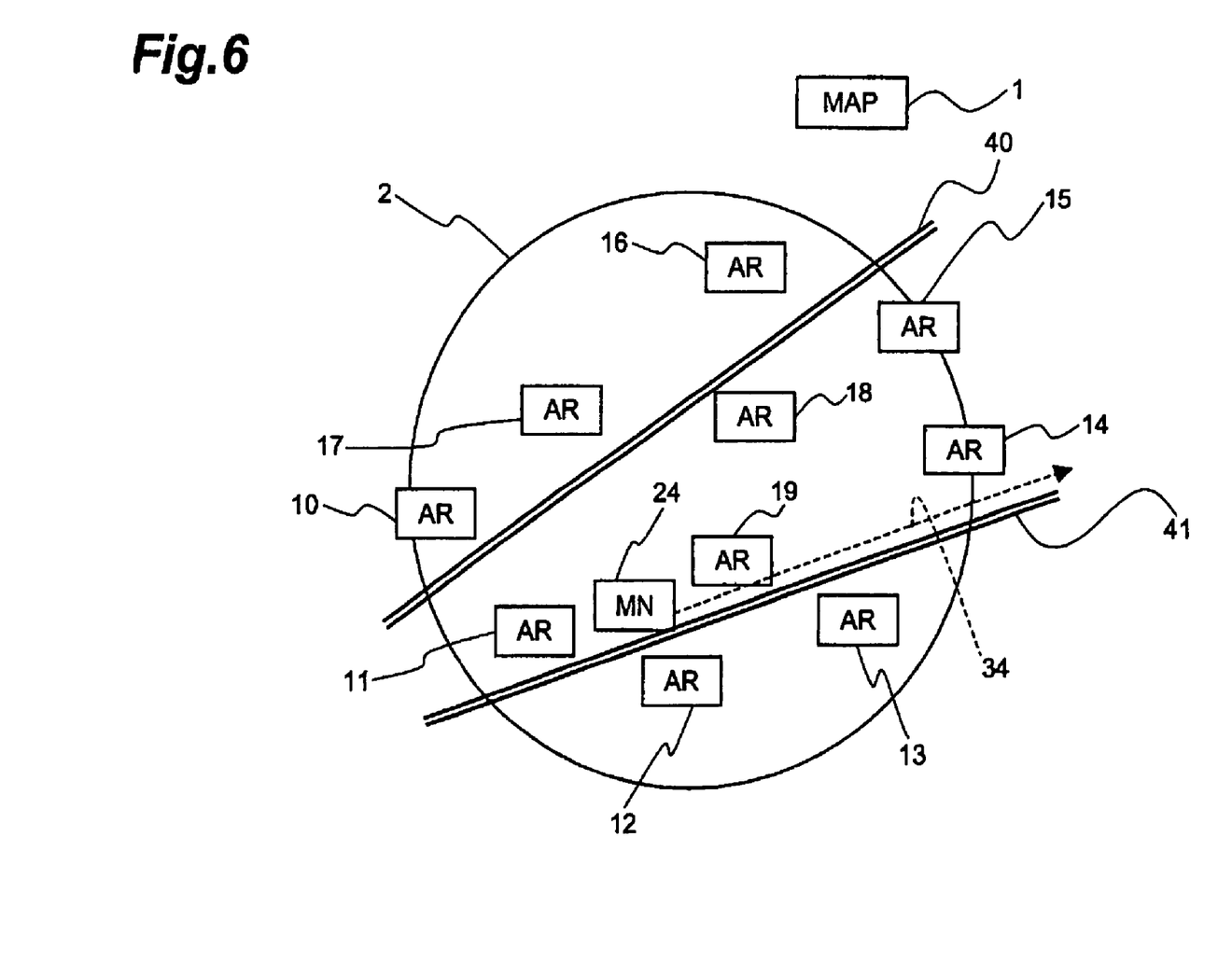
FIG. 6 is an illustration for explaining a process of paging area notification by a paging controller according to an embodiment.

FIG. 6 is an illustration for explaining the process of paging area notification by paging controller 72. Here MN 24 shown in FIG. 6 is a mobile node having the configuration similar to that of MNs 21-23. When MN 24 travels along path 34 on highway 41 and transmits a paging initialization packet to MAP 1, paging controller 72 refers to the prefix of the c/o address of MN 24 included in the paging initialization packet sent from MN 24, to specify the connection of MN 24 to AR 12. Based on this, paging controller 72 notifies MN 24 of the paging area information containing Pre11, Pre12, Pre19, Pre13, and Pre14, which includes the prefix of the network established by AR 12, as a candidate. When MN 24 first visits the service area managed by MAP 1, it stores the candidate for the above paging area information notified of by MAP 1, as it is. MN 24 sends a paging area registration request containing the stored paging area information to MAP 1 and then makes transition into the idle mode. Paging controller 72 receives the paging area registration request transmitted from MN 24, and registers the paging area information in this paging area registration request as paging area information of MN 24 in binding cache 68.

Figure 7:
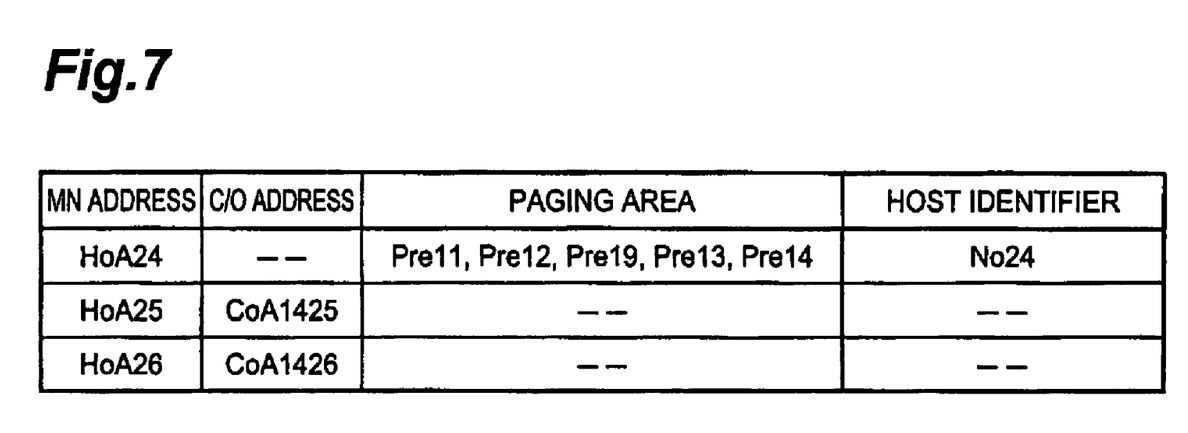
FIG. 7 is an illustration showing an example of data registered in a binding cache according to an embodiment.

FIG. 7 is an illustration showing an example of data registered in the binding cache 68. As shown in FIG. 7, paging controller 72 registers the paging area information (the set of Pre11, Pre12, Pre19, Pre13, and Pre14) included in the paging area registration request sent by MN 24, in correlation with the home address HoA24 of MN 24 registered in binding cache 68. Then paging controller 72 deletes the entry of the c/o address of MN 24 in binding cache 68 and stores the host identifier No24 of the c/o address of MN 24 in binding cache 68. Here the IP controller 64 is able to identify the MN in a state in which the paging area is registered without a c/o address in binding cache 68, as an MN in the idle mode.

When an MN visits the area twice or more and stores the paging area information of its own, it does not have to adopt the candidate notified of by MAP 1 and is allowed to transmit a paging area registration request containing the paging area information stored in itself, to MAP 1.

When paging controller 72 receives a notification of packet reception from IP controller 64 which received a packet addressed to an MN in the idle mode, it sends paging packets to addresses obtained by adding the host identifier of the MN stored in the binding cache 68, to the prefixes registered as the paging area information of the MN in binding cache 68. For example, when receiving a packet addressed to MN 24 in the idle mode for which the data is registered in binding cache 68 as shown in FIG. 7, paging controller 72 sends paging packets to five addresses with the prefixes of Pre11, Pre12, Pre19, Pre13, and Pre14 and the host identifier of No24.

When the MN receives a paging packet, it transmits a BU to MAP 1 and goes into the communication mode. Mobility manager 66 receives the BU sent from the MN and registers the c/o address included in the BU, in binding cache 68.

Figure 8:
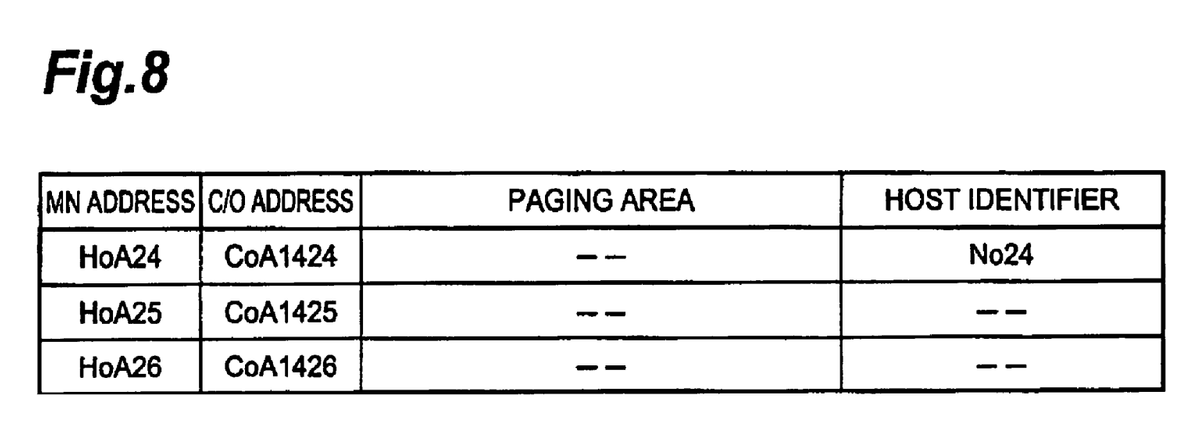
FIG. 8 is an illustration showing an example of data registered in a binding cache according to an embodiment.

FIG. 8 shows an example of data registered in binding cache 68 in a case where MN 24 transmits a BU during connection to AR 14. As shown in FIG. 8, when MN 24 transmits the BU during connection to AR 14, mobility manager 66 registers the c/o address CoA1424 of MN 24 in the BU, as a c/o address in correlation with the home address HoA24 of MN 24. Here the address of MN 24 consists of Pre14 being the prefix of the network established by connected AR 14 and No24 being the host identifier of MN 24.

Figure 9:
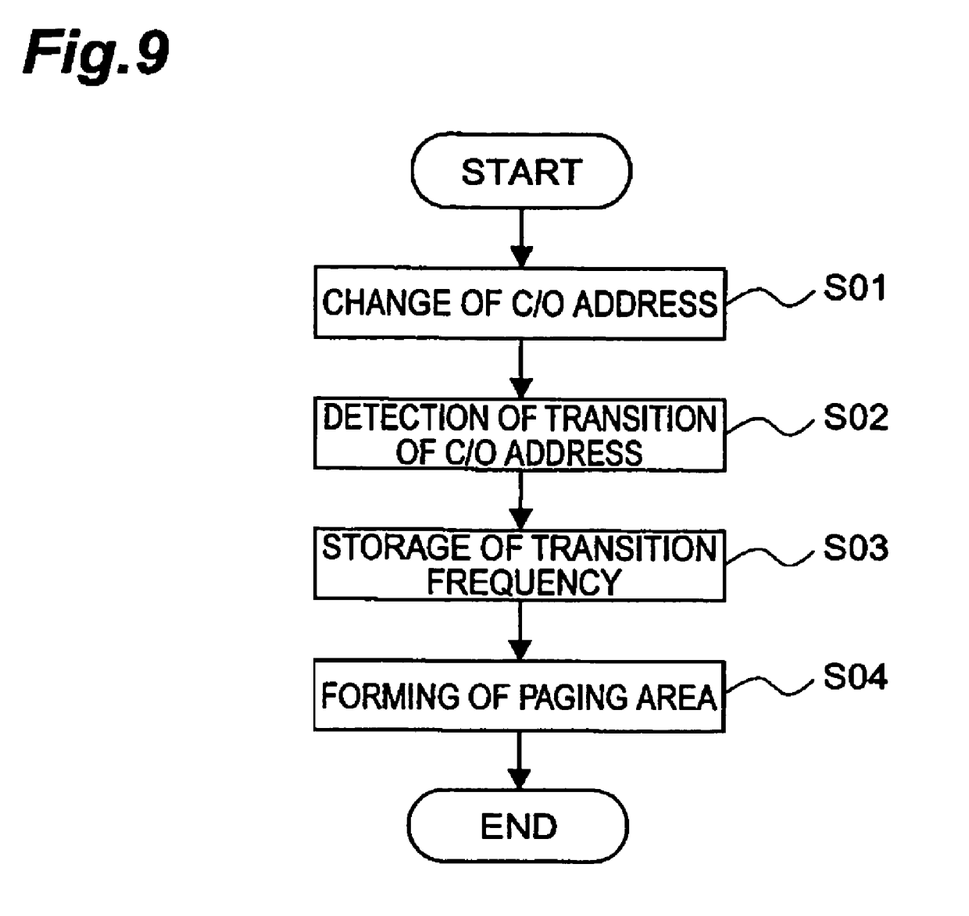
FIG. 9 is a flowchart of a paging area forming method according to an embodiment.

The operation of MAP 1 in the present embodiment will be described below. In conjunction therewith, the paging area forming method in the present embodiment will also be described. FIG. 9 is a flowchart of the paging area forming method in the embodiment. As shown in FIG. 9, with a change of AR under connection to an MN, mobility manager 66 first updates the c/o address of the MN to register it in binding cache 68 (step S01). Migration history storage 70 monitors the transition of c/o address of MN in binding cache 68 and, with a transition, it detects the prefixes of the networks before and after the transition (step S02). Migration history storage 70 records the transition frequency in correlation with the prefixes of the networks before and after the transition in the migration history table (step S03). Migration history storage 70 extracts combinations of prefixes before and after transition correlated with transition frequencies over the predetermined reference value, out of the transition frequencies recorded in the migration history table. Migration history storage 70 extracts combinations containing common prefixes, out of the extracted combinations. Migration history storage 70 defines a set of prefixes included in the combinations extracted in this way, as paging area information and notifies paging controller 72 of this paging area information (step S04).

Figure 10:
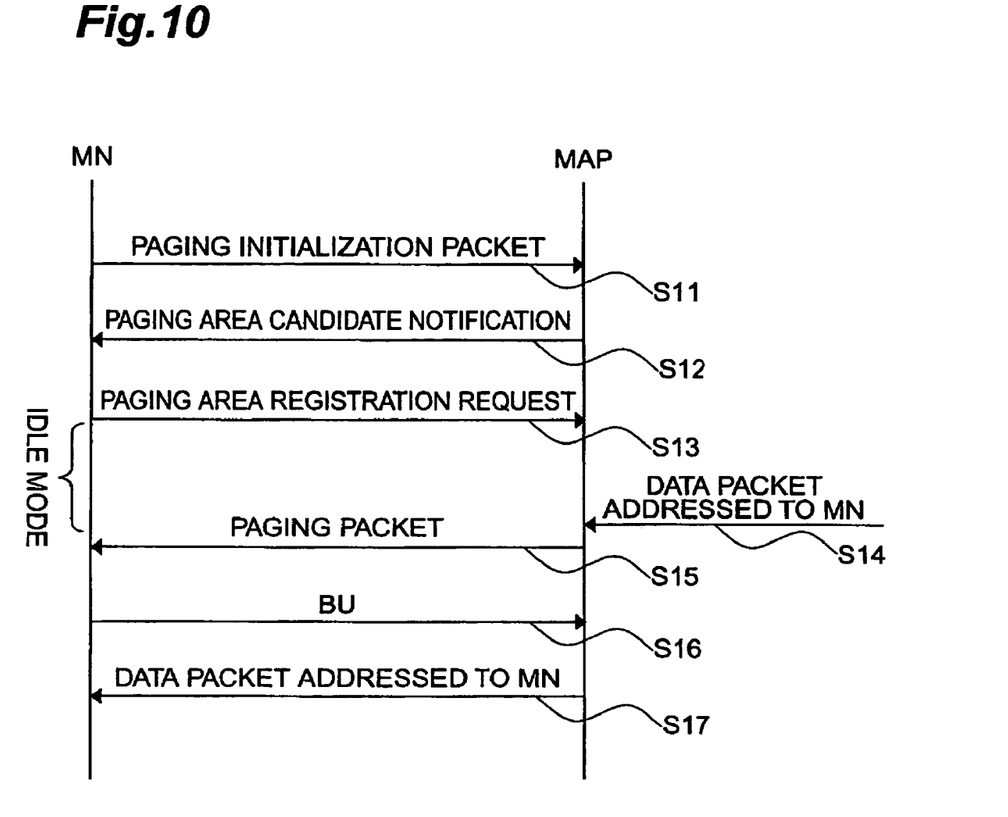
FIG. 10 is a sequence diagram showing a communication method using paging areas according to an embodiment.

A communication method using the above-described paging areas will be described below. FIG. 10 is a sequence diagram showing the communication method using the paging areas. As shown in FIG. 10, first, an MN sends a paging initialization packet (step S11). When MAP 1 receives the paging initialization packet, paging controller 72 notifies the MN of a candidate for paging area information notified of by migration history storage 70 (step S12). The MN selects one of candidates for paging area information notified of by MAP 1, transmits a paging area registration request containing the paging area information thus selected, to MAP 1, and moves into the idle mode (step S13). When MAP 1 receives the paging area registration request, paging controller 72 replaces the registration of the paging area information of the MN in binding cache 68 with the paging area information included in the paging area registration request.

When IP controller 64 detects a packet addressed to the MN in the idle mode (step S14), IP controller 64 notifies paging controller 72 of the fact of packet reception and the paging controller 72 sends paging packets to the MN (step S15). Destination addresses of the paging packets are addresses consisting of the prefixes included in the paging area information registered for the MN in binding cache 68, and the host identifier of the MN. The MN, receiving a paging packet, sends a BU to MAP 1 and then goes into the communication mode (step S16). This BU contains the c/o address of the MN in the network in which the MN is currently located. Mobility manager 66 registers the c/o address in the BU as a c/o address of the MN in binding cache 68. Thereafter, IP controller 64 transmits the packet addressed to the MN, once stored in the packet buffer space, to the MN (step S17).

Figure 11:
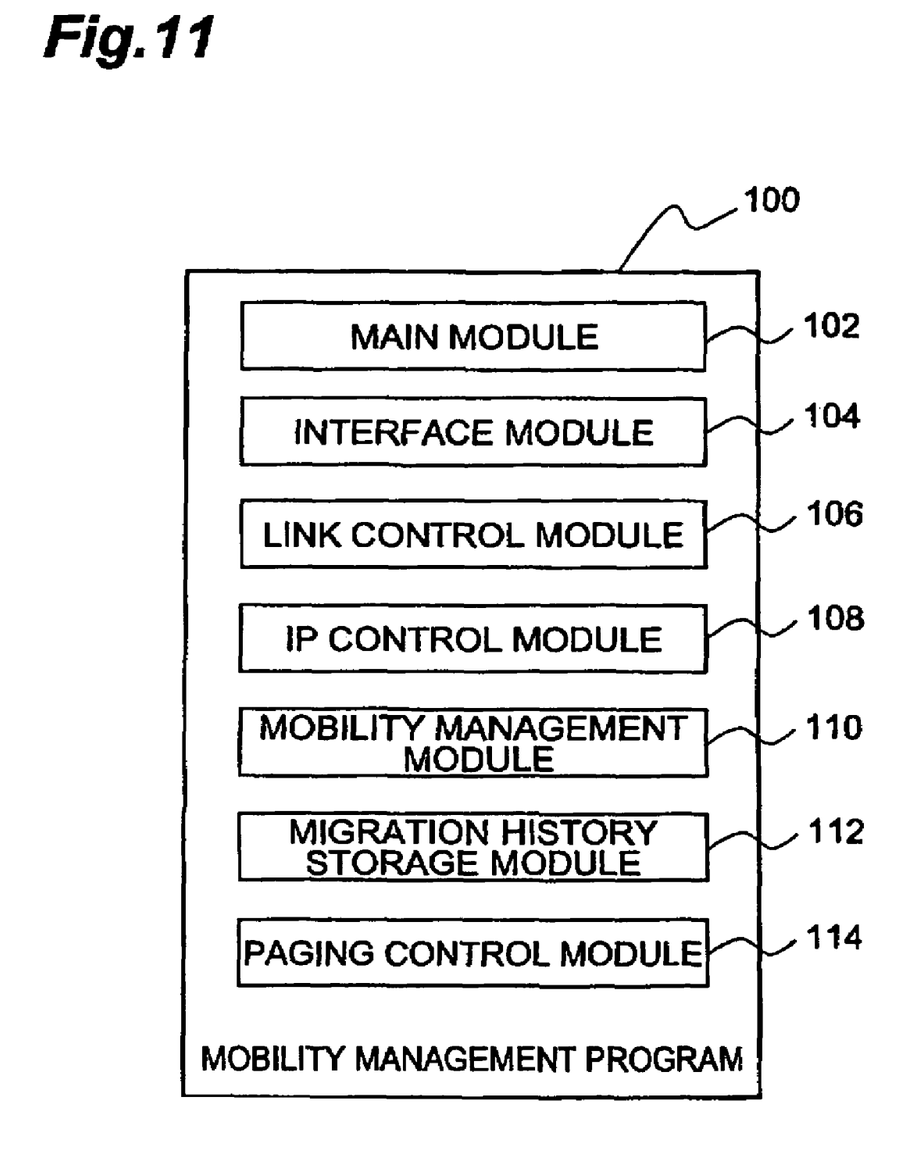
FIG. 11 is an illustration showing a configuration of a mobility management program according to an embodiment.

Mobility management program 100 according to the present embodiment will be described below. FIG. 11 is an illustration showing the configuration of mobility management program 100. Mobility management program 100 is comprised of main module 102 totally controlling processing, interface module 104, link control module 106, IP control module 108, mobility management module 110, migration history storage module 112, and paging control module 114. Here the functions substantialized through action of a computer by interface module 104, link control module 106, IP control module 108, mobility management module 110, migration history storage module 112, and paging control module 114 are similar to those of the aforementioned interface 60, link controller 62, IP controller 64, mobility manager 66, migration history storage 70, and paging controller 72, respectively. The mobility management program 100 is provided, for example, by a recording medium such as a CD-ROM, DVD, or ROM, or by a semiconductor memory. The mobility management program 100 may be one provided through a network in the form of computer data signals superimposed over a carrier wave.

The action and effect of MAP 1 according to the present embodiment will be described below. In MAP 1, migration history storage 70 monitors the transition of c/o address of each MN registered in binding cache 68. Migration history storage 70 stores the transition frequency in correlation with the prefixes before and after transition of c/o address of each MN in the migration history table. Migration history storage 70 extracts combinations of prefixes before and after transition correlated with transition frequencies over the predetermined reference value and extracts combinations containing common prefixes out of the extracted combinations. Migration history storage 70 defines a set of prefixes included in the extracted combinations, as paging area information and notifies each MN of the information. Since migration history storage 70 generates the paging area information on the basis of the transition histories of c/o addresses of MNs to form the paging areas in this way, it can form the appropriate paging areas based on the transition histories of MNs. Since MAP 1 provided with this migration history storage 70 forms the paging areas on the basis of the transition histories of c/o addresses of MNs, MAP 1 is able to form the paging areas, without need for independent management of the migration history at each MN and for notification of the migration history from each MN to the network.

Figure 12:
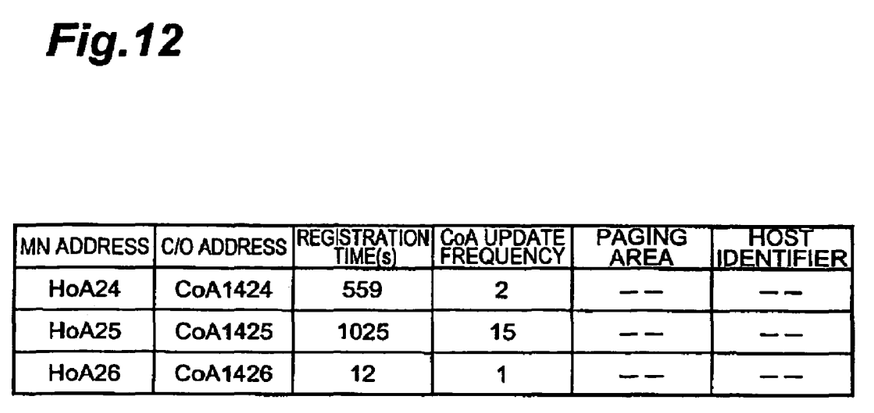
FIG. 12 is an illustration showing an example of data registered in a binding cache according to another embodiment of the present invention.

The present invention can be modified in a variety of modification forms, without being limited to the embodiments described above. For example, a potential configuration is such that migration history storage 70 forms a plurality of paging areas of different sizes and paging controller 72 notifies an MN of the paging area information of a paging area of a size according to the moving speed of the MN. More specifically, migration history storage 70 uses a plurality of predetermined reference values different from each other to generate paging area information about each of the plurality of predetermined reference values by processing similar to the above. This permits migration history storage 70 to form a plurality of paging areas of different sizes. Namely, where a predetermined reference value is large, the number of transition frequencies over this predetermined reference value is small in the migration history table and thus the set of prefixes extracted is also small. Therefore, the resultant paging area has a small size. On the other hand, when another predetermined reference value is small, the number of transition frequencies over this predetermined reference value is large in the migration history table and thus the set of prefixes extracted is also large. Therefore, the resultant paging area has a large size. Migration history storage 70 measures a registration time interval during which a c/o address is continuously registered for each MN in binding cache 68, and stores the registration time interval of each MN in binding cache 68 (which corresponds to the registration time interval measuring means). Furthermore, migration history storage 70 measures an update frequency of the c/o address registered for each MN in binding cache 68, and stores the update frequency for each MN in binding cache 68 (which corresponds to the update frequency measuring means). FIG. 12 is an illustration showing an example of data containing the registration time interval and update frequency stored in binding cache 68 by migration history storage 70. In FIG. 12, the registration time indicates the aforementioned registration time interval measured by migration history storage 70 and registered in binding cache 68. The CoA update frequency indicates the aforementioned update frequency stored in binding cache 68 by migration history storage 70. Migration history storage 70 derives an update frequency per unit time of c/o address for each MN, based on the aforementioned registration time interval and update frequency for each MN. This update frequency per unit time of c/o address indicates the number of times the c/o address is updated per unit time, and is assumed to represent the moving speed of MN. Paging controller 72 notifies an MN of paging area information of a paging area of a size according to an update frequency per unit time of c/o address of the MN, out of the plurality of paging areas of different sizes formed by migration history storage 70, according to a predetermined rule. Specifically, the predetermined rule is a rule for associating the update frequency per unit time of c/o address with the number of prefixes included in the paging area information, and rule defined so that the number of prefixes included in paging area information increases against increase per unit time of c/o address. By using this rule, paging area controller 72 is able to notify an MN of the paging area information containing prefixes in the number according to the update frequency per unit time of c/o address of the MN, determined by the predetermined rule, out of the plurality of paging area information items generated by use of the plurality of predetermined reference values. This permits MAP 1 to notify the mobile node of the paging area information of the paging area of the appropriate size according to the moving speed of the MN. Another example of the above predetermined rule applicable herein is a rule of preliminarily defining the relationship between the update frequencies per unit time of c/o address and the predetermined reference values. Namely, the potential rule is such that a small predetermined reference value is related to a large update frequency per unit time of c/o address while a large predetermined reference value is related to a small update frequency per unit time of c/o address. By using this rule, paging controller 72 determines paging area information containing a large number of prefixes generated by use of the small predetermined reference value, for an MN having a large update frequency per unit time of c/o address and assumed to have a high moving speed, and notifies the MN of the paging area information. On the other hand, paging controller 72 determines paging area information containing a small number of prefixes generated by use of the large predetermined reference value, for an MN having a small update frequency per unit time of c/o address and assumed to have a low moving speed, and notifies the MN of the paging area information.

The principles of the present invention have been illustrated and described in the preferred embodiments, but it is apparent to a person skilled in the art that the present invention can be modified in arrangement and detail without departing from such principles. We, therefore, claim rights to all variations and modifications coming with the spirit and the scope of claims.

What is claimed is:

1. A mobility management node comprising:
   mobility management means for correlating a home address in a home network of a mobile node with a care-of (c/o) address in a network where the mobile node is located after movement;
   binding storing means for storing the home address and the c/o address of the mobile node correlated with each other by the mobility management means;
   transition detecting means for monitoring transition of the c/o address stored in the binding storing means, and for detecting a prefix of the c/o address before the transition and a prefix of the c/o address after the transition;
   transition history storing means for storing a transition frequency of the c/o address in correlation with the prefix of the c/o address before the transition and the prefix of the c/o address after the transition detected by the transition detecting means;
   paging area forming means for extracting predetermined combinations of the prefix of the c/o address before the transition with the prefix of the c/o address after the transition, stored by the transition history storing means, and for generating paging area information by a set of said prefixes included in the extracted combinations; and
   paging area notifying means for notifying the mobile node of the paging area information generated by the paging area forming means.

2. The mobility management node according to claim 1, wherein the paging area forming means extracts combinations of the prefix before the transition with the prefix after the transition with each of which a transition frequency over a predetermined reference value is correlated among the transition frequencies stored by the transition history storing means, extracts combinations having the common prefixes, out of the extracted combinations, and generates the paging area information by a set of the prefixes included in the combinations finally extracted.

3. The mobility management node according to claim 2, further comprising:
   registration time interval measuring means for measuring a registration time interval during which an address of the mobile node is continuously registered in the binding storing means; and
   update frequency measuring means for measuring an update frequency of the c/o address of the mobile node stored in the binding storing means;
   wherein the paging area forming means uses a plurality of predetermined reference values different from each other to generate the paging area information as to each of the plurality of predetermined reference values, thereby generating a plurality of paging area information items, and
   wherein the paging area notifying means derives an update frequency per unit time of the c/o address of the mobile node, based on the registration time interval of the mobile node measured by the registration time interval measuring means and the update frequency of the mobile node measured by the update frequency measuring means, and notifies the mobile node of a paging area information item selected out of the plurality of paging area information items in accordance with the update frequency per unit time of the c/o address of the mobile node, based on a predetermined rule defined so that a number of prefixes included in the paging area information increases against increase of the update frequency per unit time of the c/o address.

4. A paging area forming method comprising:
   a mobility management step wherein mobility management means correlates a home address in a home network of a mobile node with a care-of (c/o) address in a network where the mobile node is located after movement, and stores the addresses in correlation with each other into binding storing means;
   a transition detecting step wherein transition detecting means monitors transition of the c/o address stored in the binding storing means, detects a prefix of the c/o address before the transition and a prefix of the c/o address after the transition, and lets transition history storing means store a transition frequency of the c/o address in correlation with the prefix of the c/o address before the transition and the prefix of the c/o address after the transition;
   a paging area forming step wherein paging area forming means extracts predetermined combinations of the prefix of the c/o address before the transition with the prefix of the c/o address after the transition, stored in the transition history storing means, and generates paging area information by a set of the prefixes included in the extracted combinations; and
   a paging area notifying step wherein paging area notifying means notifies the mobile node of the paging area information generated by the paging area forming means.

5. The paging area forming method according to claim 4, wherein in the paging area forming step the paging area forming means extracts combinations of the prefix before the transition with the prefix after the transition with each of which a transition frequency over a predetermined reference value is correlated among the transition frequencies stored by the transition history storing means, extracts combinations having the common prefixes, out of the extracted combinations, and generates the paging area information by a set of the prefixes included in the combinations finally extracted.

6. The paging area forming method according to claim 5, further comprising a registration time interval measuring step wherein registration time interval measuring means measures a registration time interval during which an address of the mobile node is continuously registered in the binding storing means; and
    an update frequency measuring step wherein update frequency measuring means measures an update frequency of the c/o address of the mobile node stored in the binding storing means;
    wherein in the paging area forming step the paging area forming means uses a plurality of predetermined reference values different from each other to generate the paging area information as to each of the plurality of predetermined reference values, thereby generating a plurality of paging areas, and
    wherein in the paging area notifying step the paging area notifying means derives an update frequency per unit time of the c/o address of the mobile node, based on the registration time interval of the mobile node measured by the registration time interval measuring means and the update frequency of the mobile node measured by the update frequency measuring means, and notifies the mobile node of a paging area information item selected out of the plurality of paging area information items in accordance with the update frequency per unit time of the c/o address of the mobile node, based on a predetermined rule defined so that a number of prefixes included in the paging area information increases against increase of the update frequency per unit time of the c/o address.

7. A computer readable medium including computer program instructions, which cause a computer to execute a method of mobility management, comprising: correlating a home address in a home network of a mobile node with a care-of (c/o) address in a network where the mobile node is located after movement;
    storing the home address and the c/o address of the mobile node correlated with each other;
    monitoring transition of the stored c/o address;
    detecting a prefix of the c/o address before the transition and a prefix of the c/o address after the transition;
    storing a transition frequency of the c/o address in correlation with the prefix of the c/o address before the transition and the prefix of the c/o address after the transition;
    extracting predetermined combinations of the prefix of the c/o address before the transition with the prefix of the c/o address after the transition, stored in the storing a transition frequency step;
    generating paging area information by a set of said prefixes included in the extracted combinations; and
    notifying the mobile node of the paging area information generated.

8. A mobility management node comprising:
mobility management unit configured to correlate a home address in a home network of a mobile node with a care-of (c/o) address in a network where the mobile node is located after movement;
a first memory configured to store the home address and the c/o address of the mobile node correlated with each other by the mobility management unit;
transition detecting unit configured to monitor transition of the c/o address stored in the first memory, and for detecting a prefix of the c/o address before the transition and a prefix of the c/o address after the transition;
a second memory configured to store a transition frequency of the c/o address in correlation with the prefix of the c/o address before the transition and the prefix of the c/o address after the transition detected by the transition detecting unit;
paging area forming unit configured to extract predetermined combinations of the prefix of the c/o address before the transition with the prefix of the c/o address after the transition, stored by the second memory, and to generate paging area information by a set of said prefixes included in the extracted combinations; and
an interface configured to notify the mobile node of the paging area information generated by the paging area forming unit.

* * * * *